Dec. 24, 1968 W. A. SWANSON 3,417,799
KITCHEN SINK ROTARY APPLIANCE
Filed Dec. 9, 1965 2 Sheets-Sheet 1

INVENTOR
WILFORD A. SWANSON
By Nilson, Robbins + Anderson
ATTORNEYS

Dec. 24, 1968     W. A. SWANSON     3,417,799
KITCHEN SINK ROTARY APPLIANCE
Filed Dec. 9, 1965     2 Sheets-Sheet 2
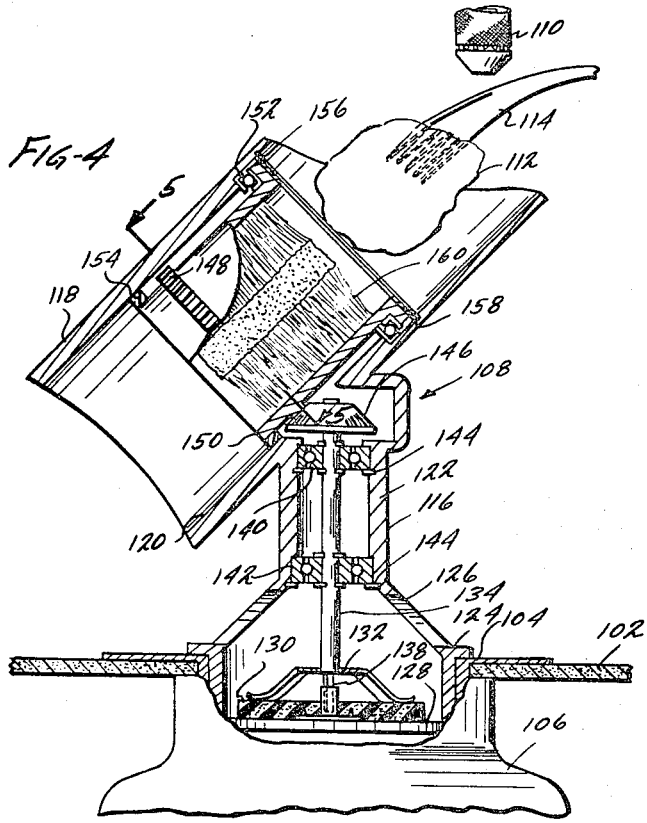
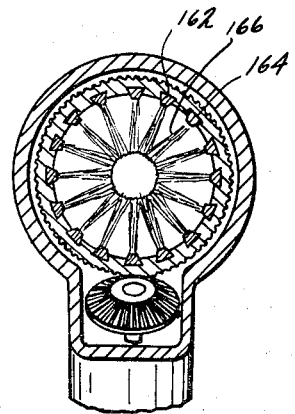
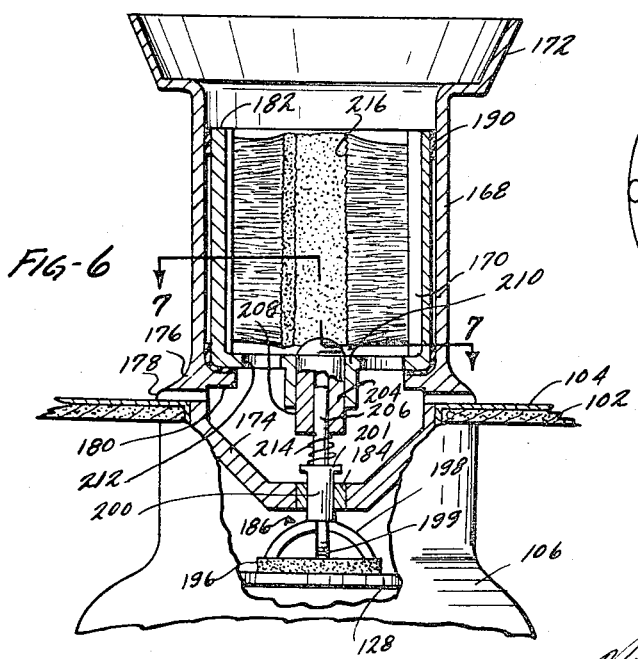
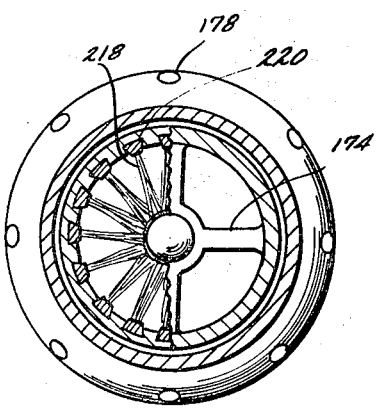
INVENTOR
WILFORD A. SWANSON
BY Wilson, Robbins & Anderson
ATTORNEYS

United States Patent Office 3,417,799
Patented Dec. 24, 1968

3,417,799
KITCHEN SINK ROTARY APPLIANCE
Wilford A. Swanson, Sun Valley, Calif.
(10730 Wheatland Ave., Sunland, Calif. 91040)
Filed Dec. 9, 1965, Ser. No. 512,491
1 Claim. (Cl. 146—50)

ABSTRACT OF THE DISCLOSURE

A rotary appliance is disclosed, e.g. potato peeler, which is mounted for use in a kitchen sink. The disclosed embodiments include a water turbine drive and a power take-off drive for connection to a garbage disposal in the sink. Two embodiments of the disposal power take-off are disclosed, one of which is aligned with the disposal, the other of which is angularly offset therefrom. The power take-offs include a mechanical coupling for snugly engaging the drain of the sink, and includes a resilient member for engaging the disposal rotary unit, which member is backed by radial braces to preserve a passage open to the disposal.

---

The present invention relates to an appliance for peeling and cleaning potatoes and other similar vegetables, and more particularly to a powered form of such an appliance.

In recent years, a wide variety of appliances have been developed to ease and assist in the preparation of foods. Many of these appliances have been adapted for use in home kitchens; however, in general, the operation of peeling and cleaning potatoes both in the home and in certain commercial establishments, has remained a difficult, time-consuming, and messy job. Of course, a wide variety of structures have been proposed in the past for peeling potatoes; however, certain difficulties have usually been attendant such structures. For example, several forms of cutting peelers or tools have been developed, yet the use of these instruments still require time-consuming hand peeling. Various electrical peelers have also been proposed; however, characteristically, such appliances have required time to set up, have been difficult to clean, and have been expensive to manufacture in a safe convenient form. As a result, such appliances have not come into widespread use. Therefore, a need exists for an economical appliance for cleaning and peeling potatoes and the like, which may be inexpensively manufactured and easily used with safety.

Accordingly, it is an object of the present invention to provide an improved appliance for cleaning potatoes and the like, which is not subject to these and other disadvantages of various prior structures.

Another object of the present invention is to provide an improved potato peeler which is driven by readily-available power as from a domestic water supply or an existing waste disposal.

Still another object of the present invention is to provide an improved power-driven appliance for cleaning vegetables which appliance may be embodied in an economical form for effective, safe and prolonged use.

A further object of the present invention is to provide an improved appliance for peeling potatoes and other similar vegetables, which appliance also flushes vegetables clean of dirt and peeling particles, yet which is safe for home use.

Still a further object of the present invention is to provide an improved appliance for cleaning and peeling potatoes and similar vegetables, which efficiently employs water under pressure to propel a scrubbing structure and somewhat simultaneously to flush the vegetable clean of loose particles.

One further object of the present invention is to provide an improved appliance for cleaning vegetables, which appliance is economical to manufacture, and safe to use as a result of incorporating a garbage disposal for drive power.

Briefly, these and other objects and advantages of the present invention are achieved in accordance with the structural features of an exemplary form thereof which includes a housing to define a cylindrical cavity containing a rotor member, the hollow interior of which carries resiliently-deformable scrubbers through which a vegetable is passed while being held against rotation by a support means. The rotor member is then driven from a readily-available source of power, e.g. domestic water power, or garbage-disposal power.

Further details of these and other novel features of the present invention along with the operation of an exemplary form thereof, as well as additional objects and advantages will become apparent and will best be understood from the consideration of the following description taken in conjunction with the accompanying drawings, which are all presented by way of illustration only, and in which:

FIGURE 4 is a vertical sectional view of an alternative form of appliance constructed in accordance with the present invention;

FIGURE 5 is a sectional view taken along line 5—5 of FIGURE 4;

FIGURE 6 is a vertical sectional view of another alternative form of appliance constructed in accordance with the present invention; and FIGURE 7 is a sectional view taken along line 7—7 of FIGURE 6.

Figure 1:
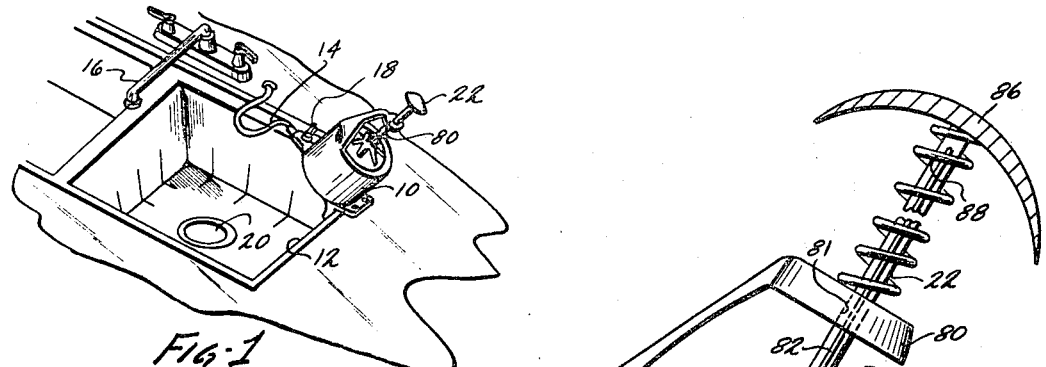
FIGURE 1 is a perspective view of an appliance constructed in accordance with the principles of the present invention mounted for use in an exemplary installation.

Prior to referring to the figures in detail, it is stressed that the particulars shown therein are by way of example only and serve merely to illustrate one useful and readily understandable form of the present invention. That is, in particular, no attempt has been made to show illustrative structure in greater detail than is necessary for a fundamental understanding of the invention, the description taken with the drawings making apparent to those skilled in the art of hydraulic appliances just how several forms of the invention might be constructed and embodied in practice. Furthermore, the detailed showing is not to be taken as a limitation on the scope of the invention which is defined by the appended claim, forming along with the drawing, a definite part of this specification.

Referring now to FIGURE 1, there is shown a unit 10 incorporating the principles of the present invention, which unit is mounted on the edge of a sink 12 and is connected to a source of water under pressure through a hose or tube 14 which may be served from the same plumbing as a sink outlet 16. In the operation of the unit 10 (which will be considered in detail below) a valve 18 in the tube 14 is opened to supply water under pressure for driving a scrubber apparatus inside the unit 10 and to flush scrubbed particles down an outlet drain 20 in the sink 12. Therefore, a vegetable to be peeled is simply placed in the unit 10 and forced therethrough by a plunger 22 to emerge from the bottom of the unit with the outer skin removed and clean of dirt and skin particles.

Of course, the unit 10 may be variously mounted and connected to a source of water under pressure. For example, it may be connected directly to the outlet 16, or alternatively it may be connected through a concealed line from under the sink 12. Further, in this regard, the unit 10 may be either permanently installed or adapted for intermittent use and therefore designed for temporary installation. In any event, the particular structure illustrated and disclosed herein is provided in the interests of presenting some readily-understandable, embodiments of the present invention which are simply exemplary.

Figure 2:
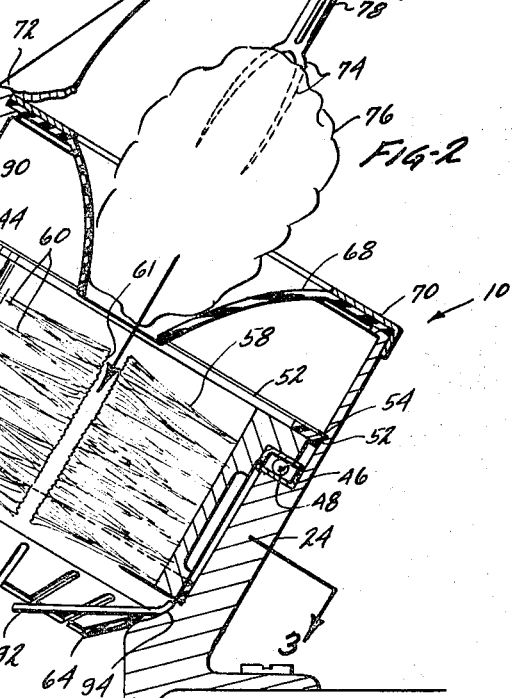
FIGURE 2 is a vertical sectional view taken through the appliance as shown in FIGURE 1.

Considering the unit in greater detail, reference will now be had to FIGURE 2 showing a sectional view through the major housing 24 of the unit. The housing 24 is generally cylindrical, hollow, and includes an integrally-formed bracket 26 affixed to the sink 12 by screws 28 to hold the unit over the sink 12, somewhat offset from the vertical. Of course, other mounting arrangements may be used. The housing 24 may be formed of cast metal or otherwise manufactured, and includes a radially extending water inlet 30 defining an interior bore 32 which terminates in a nozzle section 34. The inlet 30 carries external threads 36 to receive a female connector 38 terminating the tube 14 and which connector is integral with the structure of the valve 18. The valve 18 may comprise any of a variety of devices as exceedingly well known to provide and regulate the flow to the nozzle section 34; and therefore is not described in detail.

Figure 3:
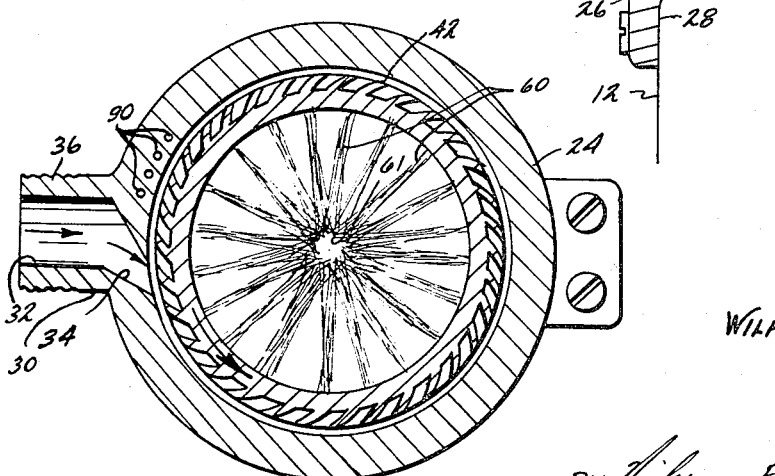
FIGURE 3 is a somewhat horizontal sectional view taken along line 3—3 of FIGURE 2.

The internal nozzle section 34 in the housing 24 is positioned to concentrate a stream or jet of water passing through the bore 32 so as to impinge on a turbine rotor 40. The rotor 40 has radially-extending turbine vanes 42 (FIGURE 3) about its annular periphery and is generally a hollow, open cylinder with an annular flange 44 (FIGURE 2) at its upper end. The flange 44 dwells on a bearing ring 46 which in turn rests on an annular upward-facing shoulder 48 formed inside the housing 24. The bearing ring 46 affords the major support for the rotor 40; however, alignment for the rotor with the interior of the housing 24 is also provided by a spacer ring 50 (which may be formed of Teflon or other plastic material) having good bearing capability and which encircles the lower end of the rotor. The rotor 40 is locked inside the housing 24 by a plastic washer 52 which may also be formed of Teflon for example, and which is held in place by a metallic snap-ring 54 fitted into an annular groove 56 formed inside the housing 24 above the shoulder 48.

The rotor 40 may be variously formed of light weight metals, alloys, plastics, or other related materials for example, and carries scrubber elements in the form of bristles 58 (FIGURE 3) extending radially into the center of the rotor 40. It is to be noted, that the bristles 58 are mounted in individual groups 60 and that the bristles 62 at the lower end of the rotor 40 extend substantially to the center of the rotor while the upper bristles 61 are shorter and define a concentric cylindrical opening through the rotor 40. The bristles may comprise stainless steel wires, various plastic materials, or other stiff resiliently-deformable materials to accomplish severe scrubbing action.

The internally-stepped cylindrical housing 24 is partially closed at its ends by flexible-flap members tending to contain water dispersed within the housing. Specifically, the lower end of the housing 24 is partially closed by an annular wiper 64 carrying inwardly-extending flaps, which wiper is affixed to a tapered shoulder 66 at the bottom of the housing and may be formed of resiliently-deformable rubber-like material. The upper end of the housing 24 is partially closed by a somewhat similar segmented sleeve 68 comprising inwardly-extending radial flaps. The sleeve 68 is affixed to the housing 24 by a sealing ring 70 covering the upper surface of the unit 10. Extending above the ring 70 is a support bracket 72 for the plunger 22, the lower end of which defines a fork 74 serving to hold a potato 76 or the like while it passes through the unit to be peeled and cleaned.

In view of the above preliminary structural description of an exemplary embodiment presented herein, a complete understanding of the composite unit and its mode of operation may now best be accomplished by describing the cleaning of a potato 76. Preliminary to operation of the unit 10, the valve 18 is opened to couple the nozzle section 34 to a source of domestic water under pressure. In general, the unit has been found to operate satisfactorily at relatively low levels of water pressure, however, it is usually desirable to provide plumbing which does not incorporate sizable hydraulic losses unless a rather high-pressure domestic source of water is available.

Another preliminary step in the operation involves impaling the potato 76 on the fork 74. This is accomplished simply by holding the potato 76 under the fork 74 and depressing the plunger 72 so that the shank 78 thereof moves downwardly through the holder 80 to impale and thus hold the potato. It is to be noted, that the holder 80 contains a keyway 81 carrying an elongate key 92 integral with the shank 78, which holds the shank against rotation. In pressing the plunger 22 downward, a knob 86 is provided to assist in applying the necessary force to overcome a coil spring 88 which urges the activator 22 upward.

With the potato 76 impaled, and the valve 18 open to pass water, the appliance is ready for an actual cleaning operation. In this regard, it is to be noted that the water flowing through the nozzle section 34 impinges on the vanes 42 causing the rotor 40 to revolve at a relatively high speed. The driving water moves generally about the periphery of the rotor 40 tending to develop some pressure head behind the nozzle section 34. That pressure is relieved between the spacer 50 and the rotor 40 and through ports 90 which provide water above the bristles 58, serving to flush the potato 76 and the bristles clean.

As the knob 86 is forced downward, the potato 76 is pushed through the sleeve 68 into the space defined by the bristles 61. In this manner, the skin of the potato 76 is removed by a rotary scrubbing action while it is being held (against rotation) on the plunger 22. That is, the fork 74 holding the potato 76 is held against rotation by the key 82 received in a keyway 81 in the holder 80.

Normally, the potato 76 is pushed through the unit rather rapidly; however, some judgment based on a little experience must be exercised in this regard. As the potato 76 contacts the lower bristles 62, the end of the potato is also effectively skinned or peeled. Of course, as the potato 76 is urged through the bristles 62, they are resiliently distorted to permit passage of the potato on through the wiper 64.

As the potato 76 passes through the wiper 64, it urges a leaf spring 92 downward in a somewhat pivotal motion about the upper end 94 of the spring which is affixed to the housing 24. At a point of the potato's travel, when it is substantially through the rotor 40, the plunger 86 is released to withdraw the fork 74 from the peeled potato. The potato 76 is thus held against upward movement by the leaf spring 92 which either engages the upper surface of the potato or pierces the side of the potato depending upon the depth to which the potato is pushed before the plunger is withdrawn. In any event, the fork 74 is withdraw from the potato leaving it held, if at all, only by the leaf spring 92. Normally, the leaf spring 92 then drops the potato clean and peeled.

It is to be noted that virtually all the water entering the housing 24 eventually passes through the wiper 64 so that when the potato has passed through the unit, it is well flushed and all pieces of skin, dirt, and other loose particles are removed. In the operation of the unit, it is also to be noted, that most particles removed from the potato 76 are flushed from the unit and carried into the drain 20 to minimize cleaning operations. In general, the particles are quite small and pass freely through the drain 20; however, in many installations, operation will be in conjunction with a garbage pulverizing unit which rapidly clears the particles from the drain 20. Furthermore, in relation to the garbage unit or rotary disposal unit, a source of power is readily available therein which may be employed to drive a peeler incorporating the principles of the present invention. Exemplary embodiments of such a peeler are shown in FIGURES 4 through 7, the first of which will not be considered in detail. Referring to FIGURE 4, there is shown a sink 102, incorporating a drain 104 which is equipped with a rotary garbage disposal 106. The peeler 108 of FIGURE 4 is adapted to function in conjunction with the disposal 106 contained in the drain 104, and also with a water outlet or source 110. In general a potato 112 or the like supported on a fork member 114, as previously described with reference to FIGURE 2, to be held against rotation and forced into the peeler 108.

Considering the structure of the peeler 108 in greater detail a unitary housing 116 includes a cylindrical section 118 (defining a cylindrical cavity 120) and an angularly offset circular drive support 122 incorporating an annular flange 124 which dwells in the drain 104 to support the peeler 108. The support 122 is ported by bores 126 through which the sink 102 may drain into the disposal 106.

Inside the support 122, the upper end or rotary head 128 of the disposal 106 is engaged by a rubber-like coupling 130 which serves to provide power to the peeler 108. The coupling 130 is backed by radial leaf-spring braces 132, and coupled to a rotatably mounted shaft 134 by a fastener 136 (in the coupling 130) which terminates in a shaft 138 which may be telescopically received in the shaft 134 and spring biased downwardly to engage the coupling 30 with the head 128.

The rotatably mounted shaft 134 is carried between roller bearings 140 and 142 which are held inside the support 122 by snap rings 144, and also locked to the shaft 134. The upper end of the shaft 134 carries a bevel gear 146 which engages a gear wheel 148 carried on the exterior cylindrical surface of a rotor 150. The rotor 150 is mounted for movement within the cylindrical section 118, dwelling on ballbearings 152 and a spacer ring 154. The ballbearings 152 are mounted between an outwardly-extending flange 156 of the rotor 150 and an internal shoulder formed inside the cylindrical section 118. The rotor 150 is locked in position by an annular snap ring 158 which is fixed into a groove about the inside of the section 118. The actual scrubbing or peeling operation is accomplished in the unit of FIGURE 4 by bristles 160 extending into the open interior of the rotor 150. The bristles are comprised of several independent brush members 162 (FIGURE 5), which in turn comprise an elongate trapezoidal-cross-section base 164 matingly received in a slot in the interior of the rotor 150 and providing a row 166 of bristles.

The structure of FIGURE 5 may be variously formed of metal or plastic components in accordance with individual design considerations. However, one specific feature involves the interchangeability of the bristle-carrying bases 164 which simply slide into internal grooves in the rotor 150. Thus, the bristles, formed for example of stainless steel, resilient plastic, or various other materials may be periodically changed after being reduced by wear.

In using the unit as shown in FIGURES 4 and 5, the support 122 is simply placed into the drain 104 so that the coupling 130 engages the rotary disposal 106. Water is then supplied through the source 110 to flow into the cylindrical section 118, then the disposal 106 is energized to revolve the shaft 134, in turn revolving the rotor 150. Next, a potato 112 is mounted on the member 114 and urged into the rotating bristles 160. As a result, the potato 112 is scrubbed and flushed clean of peel and foreign particles. The member 114 may be an integral part of the unit of FIGURE 4 as shown in the embodiment of FIGURE 2, or alternatively, the member 114 may simply comprise an independent holder.

After a period of scrubbing, the potato 112 may be either withdrawn from the peeler 108 or forced through the peeler into the sink 102. Thus, a clean, peeled, and washed potato is provided in a very short time.

In still another embodiment of the present invention, considerable simplicity results in an economical, effective unit. Reference will now be had to FIGURES 6 and 7 for a detailed description thereof, and in which previously identified elements carry a similar identification numeral.

In the structure of FIGURES 6 and 7, the peeler 168 fits into the drain 104 of a sink 102, for direct engagement with the disposal 106. The peeler 168 includes a cylindrical housing 170 having a flared opening 172 at the upper end, and an inwardly-tapered base 174 to be received in the drain 104. Above the base 174, the housing 170 incorporates an annular flange 176 defining several bores 178 through which water may drain to the disposal 106. Inside the housing 170, and just about the bores 178, an internal annular flange 180 is formed to support a rotor 182. The entire housing 170 may be integrally formed of plastic or other material as by various molding techniques. Furthermore, necessary bearing surfaces in the housing 170 may be cast in position. Specifically, a bearing 184 is contained at the center of the base 174 to receive the power coupling 186, and ring bearings 188 and 190 are contained inside the major cylindrical portion of the housing 170 to engage and support the rotor 192. In this regard, while the bearing ring 190 is of rectangular cross-section, the bearing ring 188 is formed to provide an angle so as to support the bottom corner 194 of the cylindrical rotor 192. The bearings 188 and 190 as well as the bearing 184 may be formed of Teflon or other low-friction materials.

Considering the coupling 186 in greater detail, a shoe or base coupling 196 is affixed to radial braces 198 and a rotary shaft 199. The shaft 199 is fixed in a cylindrical slider 200 journaled into the bearing 184, and having a locking flange 201 at the top thereof. Above the slider 200, a shaft 204 with a locking key 206 extends into a hub 208 of the rotor 192. The hub 208 is fixed concentrically to the bottom 210 of the rotor 192, which bottom contains ports 212. The shaft 204 carries a coil spring 214 which urges the slider 200 downwardly, thereby engaging the coupling 196 with the head 128 of the disposal.

Inside the hollow cylindrical rotor 182, bristles 216 lie radially to accomplish the peeling operation. The bristles 216 are formed in rows 218 (FIGURE 7) contained in trapezoidal-section base members 220 to be received in mating slots formed in the rotor 182 substantially as described with reference to the structure of FIGURES 4 and 5.

In using the apparatus as shown in FIGURES 6 and 7, the unit is simply placed over the disposal 106 so that the coupling 196 engages the head 128 of the disposal 106. With the disposal 106 energized and with water entering the housing 170 through the opening 172, a potato or the like is dropped into the housing to move freely therein while being scrubbed by the bristles 216. During the scrubbing operation, water flowing into the unit flushes particles through the ports 212 and the open base 174 into the disposal 106. After a brief period of scrubbing action, the disposal 106 is de-energized and the potato or the like removed by hand from the rotor 182. Thus, an exceedingly simple structure is presented for peeling and scrubbing potatoes and the like, which structure incorporates a water intake through an open end to flush the vegetable clean while rotary scrubbers act to remove the peel.

In general, important features of the present invention reside particularly in the fact that the unit is economical to manufacture, trouble-free to operate, and accomplishes clean water-flushed potatoes or the like without the danger or expense of manufacture generally attendant electrical systems.

Thus, a number of features are readily apparent from the structure considered; however, the invention is not to be limited to such structures which are described as merely illustrative. Rather, the system of the present invention shall be deemed determined in accordance with the claims as set forth below.

What is claimed is:

1. A rotary appliance for use in a sink along with a disposal mounted in the drain of said sink, and a water outlet, as for peeling potatoes and performing like domestic operations, comprising:

a housing defining a generally cylindrical cavity therein;

a rotary operating means rotatably affixed within said housing for accomplishing one of said operations;

an elongate shaft, having an upper end coupled to said rotary operating means, and a lower end for receiving rotary motion to drive said operating means whereby said housing is spaced apart from said drain as to receive water from said outlet;

a bearing support means adapted to be receivably supported in said drain, and including spaced apart bearings for affording radial support to said elongate shaft in passing therethrough; and coupling means affixed to the lower end of said elongate shaft and including a resilient member and a plurality of spaced-apart spring braces for engaging the upper end of said disposal by resilient mating of said resilient member whereby to rotatively drive said elongate shaft to thereby in turn revolve said rotary operating means, said spaced-apart braces providing openings from said drain.

References Cited

UNITED STATES PATENTS

| | | | |
|---|---|---|---|
| 810,548 | 1/1906 | Meyer | 15—3.12 |
| 1,452,738 | 4/1923 | Hoberg | 146—49 |
| 2,781,175 | 2/1957 | Metzger | 146—50 X |
| 2,811,995 | 11/1957 | Bremmer | 146—49 |
| 2,952,287 | 9/1960 | Clasen | 146—50 |
| 3,009,658 | 11/1961 | Resk. | |

W. GRAYDON ABERCROMBIE, *Primary Examiner.*

U.S. Cl. X.R.

15—3.14